United States Patent Office 3,487,732
Patented Jan. 6, 1970

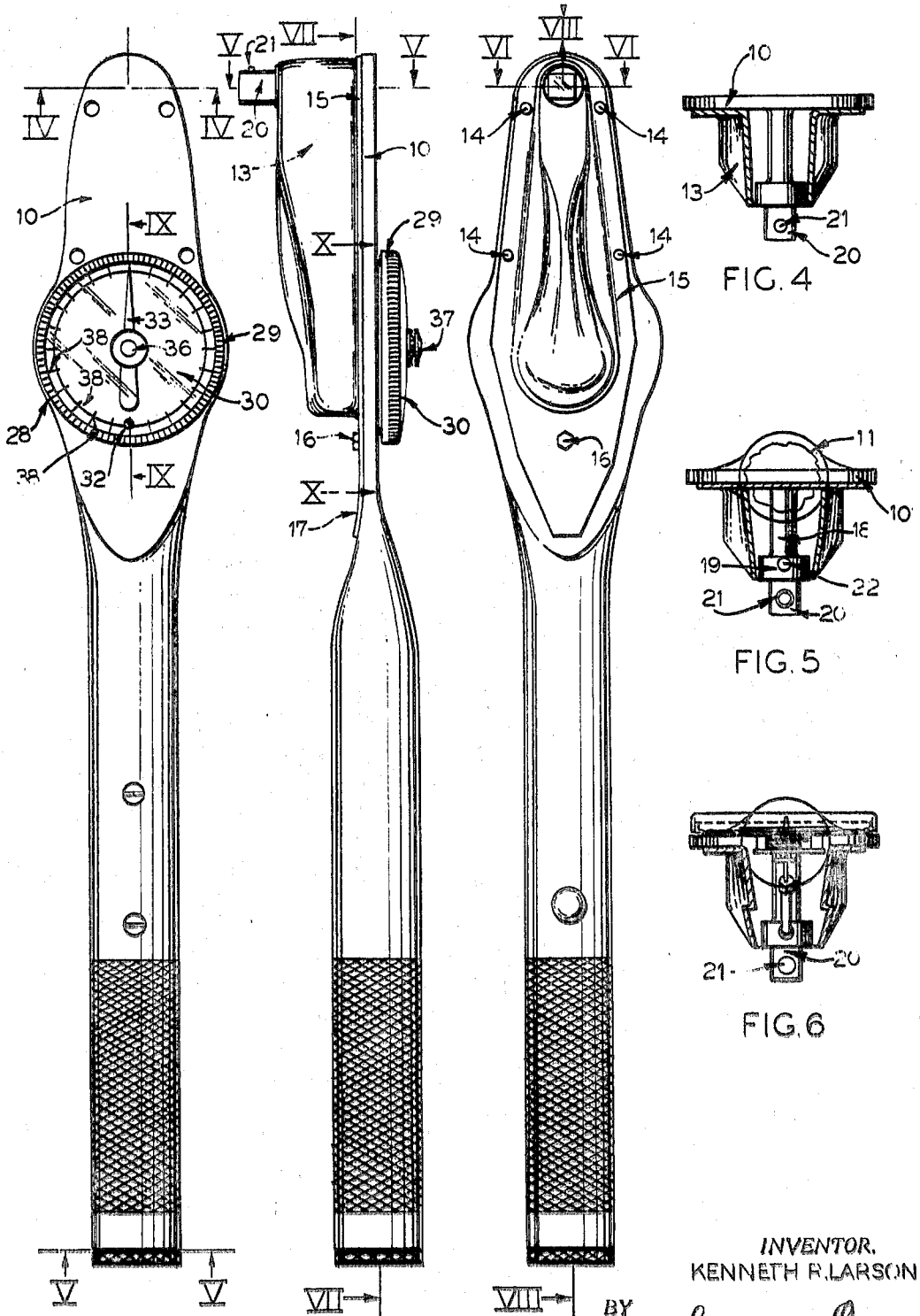

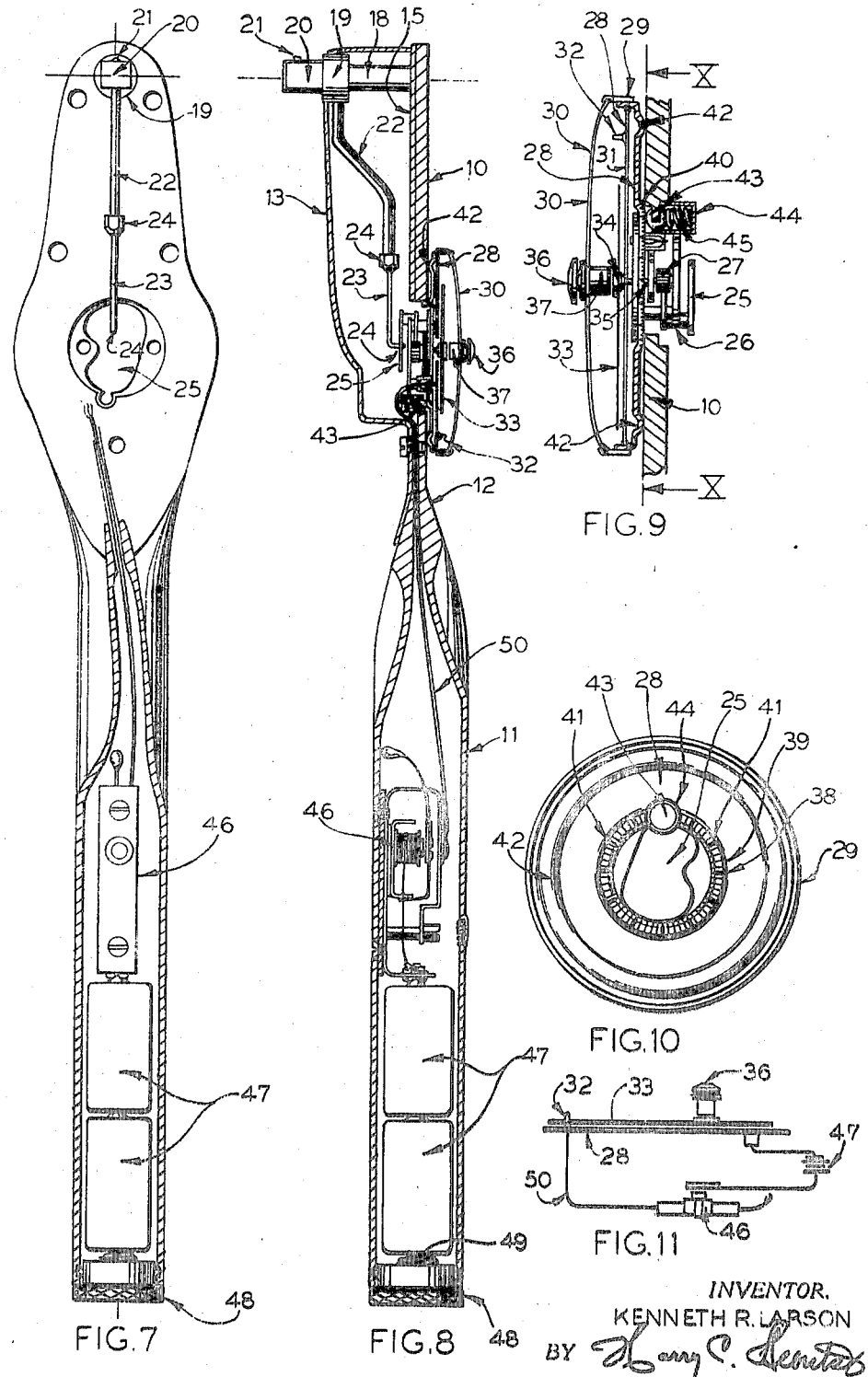

3,487,732
PRESET ADJUSTABLE TORQUE MEASURING DEVICES OF THE BRAILLE TYPE
Kenneth R. Larson, Des Plaines, Ill., assignor to Snap-On Tools Corporation, Kenosha, Wis., a corporation of Delaware
Filed May 5, 1966, Ser. No. 547,983
Int. Cl. B25b 23/14; G01l 5/24
U.S. Cl. 81—52.5       10 Claims

ABSTRACT OF THE DISCLOSURE

This disclosure involves the calibration of measuring instrument meters with different degrees of notches on the dial thereof, and providing a rotatable peripherally knurled ring as a part thereof to confront the dial with click-type expedients to make contact with the graduated notches which respond to audible and physical feel indications so that the blind and even the hard of hearing may utilize the measuring instrument to pre-set same to any value within its capacity.

The individual graduations are preferably in the form of fine notches and heavier and/or deeper notches are provided every fifth individual notch so that the blind or deaf user may count the graduations through the touch or Braille system, thereby presetting the dial mechanism which may also be provided with graduated visual digits for proofreading by a supervisor or other attendant.

An initial zero pin is provided on the dial for a friction mounted pointer to establish contact therewith to energize a signal such as a vibrator when the measuring instrument is set at initial zero position (without load) and also when the measuring instrument reaches its preset position with a load. While a rotatable calibrated dial meter may have some advantages, it should be noted that this teaching may also be applied to a linear graduated or calibrated scale should commercial practice so dictate.

---

This invention relates to turning devices and more particularly to torque measuring and indicating wrenches of the type that can be adjusted, preset, and read by blind mechanics and utilizing the features shown and described in United States Letters Patents Nos. 2,312,104, 2,367,224, 2,792,734 dated Feb. 23, 1943, Jan. 16, 1945 and May 21, 1957, respectively, which are general purpose torque wrenches as distinguished from a more or less special purpose measuring wrench or device involved herein, although the teachings of the present invention may be employed for general use with equal advantage.

It contemplates more especially the provision of measuring instrumentalities of the torque wrench type that may be audibly reset or preset, and which will signal through other than visual means, the loading thereof up to the any preset limit so that mechanics devoid of sight and even hearing faculties may advantageously utilize the measuring instrument in their normal operations to tighten and loosen nut and similar fasteners with precision. This application is a continuation-in-part of my application Ser. No. 721,544 filed Mar. 25, 1968 which is a continuation of my abandoned application Ser. No. 381,408 filed July 9, 1964.

It has been recognized for some time that visual responses to measuring instrumentalities on wrenches and the like used in production operations, are not too precise nor momentary so that reliance upon audible and primarily vibratory indicators are preferred. This is particularly advantageous to the blind and the deaf who can detect sound accompanied by some physical manifestation such as vibrations sensed through feel and touch. The teachings of the present invention involves the use of measuring instrumentalities for torque wrenches and the like which are set by feel and respond to their setting with vibratory audible signals when the load impressed upon the torque wrench reaches its preset value so that sight nor even perceptive hearing is a vital factor in the use of the measuring device.

One object of the present invention is to provide a click-type setting for measuring instruments when used in connection with precision instruments such as but not limited to torque wrenches and the like.

Another object is to provide a measuring instrumentality for a mechanical device such as a torque wrench so that blind and even some deaf individuals can preset the calibrated measuring control and audibly or through feel be advised when the load impressed upon the device has reached its preset limit.

Still another object is to provide an improved measuring dial presetting device which responds to audible and physical feel indications so that blind and even the hard of hearing may utilize such devices to their fullest extent.

A further object is to provide a calibrated measuring instrument with a variation of setting clicks as to intensity so that blind or even hard of hearing attendants may preset same and receive a responsive signal intelligible to them when the load has reached the preset limit desired for the particular task involved.

A still further object is to provide a measuring instrumentality divided as to its major and minor calibrations as to varying intensities of clicks so that a blind or even hard of hearing mechanic or mechanics can utilize same without aid or confusion.

Still a further object is to provide a torque wrench with a calibrated measuring instrumentality that is divided into a sequence of four minor click divisions and one major audible click for every five digits on a calibrated scale so that when the dial is returned or indexed to an initial position, the blind attendant can preset the device to energize an audible or vibratory signal when the device has been loaded to its extreme limit of setting.

Other objects and advantages will appear from the following description of an illustrated embodiment of the present invention.

In the drawings:
FIGURE 1 is a plan view of a torque wrench embodying features of the present invention.
FIGURE 2 is an edge view in elevation of the wrench illustrated in FIGURE 1.
FIGURE 3 is a bottom plan view of the wrench shown in FIGURES 1 and 2.
FIGURE 4 is a fragmentary sectional view taken substantially along line IV—IV of FIGURE 1.
FIGURE 5 is a fragmentary sectional view taken substantially along line V—V of FIGURE 2.
FIGURE 6 is a sectional view in elevation taken substantially along line VI—VI of FIGURE 3.
FIGURE 7 is a sectional view taken substantially along line VII—VII of FIGURE 2.
FIGURE 8 is a sectional view taken substantially along line VIII—VIII of FIGURE 3.
FIGURE 9 is a sectional view of the measuring meter taken substantially along line IX—IX of FIGURE 1.
FIGURE 10 is a sectional view taken substantially along line X—X of FIGURES 2 and 9.
FIGURE 11 is a diagrammatic view of the signal circuit in the device.

The structure selected for illustration is not intended to serve as a limitation upon the scope of the invention, but is merely illustrative thereof. There may be considerable variations and adaptations of all or part of the teachings depending upon the dictates of commercial practice. The present invention in its preferred embodiment comprises an elongated steel plate member 10 which merges into a tubular handle member 11 having a more or less flattened shank 12 therebetween. A hollow housing 13 shaped to conform with the plate member 10 but somewhat smaller in outline relative thereto, is attached thereto by means of fasteners 14 provided through the peripheral flange 15 on the housing 13, and a machine screw 16 extends through the shank covering portion 17 of the housing 13 to enclose the working parts to be hereinafter described.

As shown, a rigid cylindrical steel elongated shank 18 is anchored to the plate 10 proximate to its free end to provide an enlarged cylindrical shoulder 19 from which projects an integral geometrically shaped work engaging member 20 usually of square cross-section and of standard size to receive wrench sockets frictionally held thereon by means of spring impelled ball detents 21 of standard and well known construction. The hollow housing 13 is bored to receive the work engaging member 20 therethrough so that it may freely turn responsive to resisting a torque load as will be described hereinafter. As the elongated shank 18 resists the torque turning load, it will twist proportional to the load impressed upon a fastener such as as nut which is in mechanical connection with the work engaging member through the medium of a wrench socket disposed therebetween.

A twist translating rod 22 is anchored in the shank hub or shoulder 19 to extend along the length of the plate 10 in parallel spaced relation thereto for connection to a comparatively smaller rod extension 23 which is frictionally connected thereto by a tapered clutching nut 24 known in the art and of standard construction. The twist translating rod extension 23 terminates in a lateral offset 24 that connects with a thin plate 25 serving as a bell crank to actuate linkage 26 and a pinion 27 comprising part of a standard dial mechanism which includes a pinion shaft that extends through a dial plate 28 which is part of the meter casing 29 that retains a transparent crystal 30 thereover. A calibrated dial of circular shape 31 that carries a stationary pin 32, is disposed above the dial plate 28 to cooperate with a pointer 33 fixed to a friction clutch mount 34 that responds to the pinion shaft 35 as well as to a knob 36 that extends axially through the crystal 30 of the calibrated measuring dial mechanism 28–29.

The dial mechanism knob 36 extends through the dial transparent crystal 30 inwardly of the metering casing 29 to engage a friction amount 37 which carries the indicator pointer 33 above and in confronting relation to the circular dial plate 28 which is suitably provided with circumferentially spaced graduations 38 representing the values in inch-pounds or foot-pounds depending upon the capacity of the measuring device involved. These graduations are preferably divided into individual units representing one inch-pound or one foot-pound, and each five such graduations or units is visually divided by a heavier and longer divisional graduation or line 38' representing a value of five times the individual or fine graduations or units 38 (FIGURE 1) and these are indexed and aligned with a series of corresponding and circumferentially spaced individual notches 39 indented into the bottom side of the dial plate 28 (FIGURE 10) provided in a depressed central portion 40 thereof. It should be noted that the fine individual circular graduations in the form of distinct fine notches 39 are separated by deeper and coarser notches 41 at every fifth individual notch 39 to align with and correspond to the fine individual graduations 38 and the heavier and longer inscribed graduations 38' at every fifth individual graduation 38 so that the graduated digits in front of the dial 28 and those notches 39–41 on the depressed central dial area constituting the bottom surface thereof, are identical in conforming values. To maintain the measuring dial casing 29 in alignment and balanced on the wrench plate 10, the outer circumferential region of the dial plate 28 is provided with a depressed annular groove 42 depending the same extent as the depressed central region or portion 40 thereof for steady and balanced support of the measuring dial housing 29 on the plate 10 to which it is rotarily mounted by means of the measuring actuating pinion drive shaft described supra.

In order to index the dial measuring housing or casing 29 through the audible or physical sensation of finger feel or response by blind mechanics and afford some control without sight through a Braille-type detection, a spring impelled ball 43 is reciprocally mounted in a cylindrical cage 44 attached to the underside of the wrench plate 10 to confine a coil spring 45 therein against the ball detent 43 which thrusts it against the graduated fine notches 39 and the coarser notches 41 (FIGURES 9 and 10) to retain the measuring dial housing 29 in any one of the adjusted positions determined by the notches 39–41. This provides an expedient for blind people and even blind and deaf people who have a sense of feel, to adjust the dial mechanism 29 with the aid of instrumentalities to orient the position of the dial pointer 33 as will be presently described. To this end, the dial 28 is provided with an upstanding pin 32 against which the pointer 33 can be positioned in either clockwise or counterclockwise direction (viewed from FIGURE 1) by manipulating and turning the pointer knob 36. When so adjusted, the user knows that the pointer is indexed to a zero or initial position depending upon whether or not the wrench is to be used in tightening or loosening the fastener to which it is to be applied. During this indexing by turning the knob 36, the user then knowing that the pointer is at initial reckoning position, starts to turn the casing 29 which is exteriorly knurled for that purpose and by determining and counting the number of fine ball detent clicks or physical feel responses to the riding of the ball 43 in the notches 39 plus the number of times the heavier clicks corresponding to riding over the deeper and coarser notches 41 accurately cut-in at every fifth individual fine notch 39 which are uniformly spaced circumferentially around the face of the dial 28 which is calibrated for every unit of load measurement such as one inch pound or foot pound depending upon the capacity of the wrench. Thus, in the circumferential traversing of the ball 43 thereover and therein, a multiple of five clicks are heard or felt, and by counting the fine and coarse clicks the blind and some deaf and blind users can position the pointer 33 to the desired predetermined value at which the fastener is to be turned from the initial zero pin position 32.

When the pointer is rotarily displaced by turning the wrench handle plate extension or member 11 with the work engaging member shank 20 having a wrench socket or other complemental tool for registry with the fastener to be turned, to apply a torque load thereto, the pointer 33 is rotarily displaced by the twist imparted to the torsion resisting shank 18 (FIGURE 8) and this actuates the measuring instrumentalities to the value of torque load until the pointer 33 strikes or makes contact with the dial pin 32 commensurate with the setting thereof at a predetermined value for the particular turning job at hand and for which the user is given instructions. When the pointer 33 strikes the pin 32, an electrically energized circuit is closed as will presently be described to operate a buzzer or vibrator 46 provided in the tubular handle extension 11 (FIGURE 8). This buzzer or vibrator is of a type which will generate both audible and feel responsive vibrations which signal that the load has reached its predetermined maximum desired for the particular job and the user without sight and in some instances without both sight and hearing, can be signalled to stop any further application of force and to remove the wrench from the fastener being turned.

The buzzer and vibrator 46 is in circuit with dry cells 47, in this instance two, fitted into the handle 11 for retention by an end plug 48 which carries a spring impelled contact 49 against the bottom cell 47 to establish the circuit when the pointer 33 makes contact with the pin 32 anchored on the dial 28 in the path thereof. The pin 32 is suitably insulated from the dial 28 and this is also true of the pointer 33 in relation to the knob 36 so that the circuit is never closed until there is metallic contact between the pointer 33 and the pin 32. This only occurs when the wrench handle 11 has been turned with the fastener to the extent necessary to reach the predetermined load originally set by the user who manipulates and turns the dial casing or housing 29 and counts off the clicks he either hears or feels or both to displace the pointer pin 32 a desired span from the pointer 33 commensurate with the load required to again bring these instrumentalities 32–33 in contact to energize the buzzer or vibrator 46 and transmit the audible and feel signal that can be detected by the blind and some blind and deaf mechanics.

With the arrangement of parts above described, it will be apparent that a Braille-type mechanism has been provided that will extend the field of usefulness of blind and some blind and deaf people to bench-type industrial assembly work or other mechanical duties requiring accurate turning operations usually possible for people with sight. This expands the scope of usefulness of the handicapped, and the mechanism is so simple to operate that very little instruction is necessary and there is very little opportunity for accident or mistake.

While I have illustrated and described a preferred embodiment of my invention, it must be understood that my invention is capable of considerable variation and modification without departing from the spirit of the invention. I, therefore, do not wish to be limited to the precise details of construction set forth, but desire to avail myself of such variations and modifications as come within the scope of the appended claims.

I claim:

1. In a preset measuring device, the combination with a handle member, of a torque responsive work engaging member adapted to yield commensurately with a load transmitted thereto through said handle member, torque transmitting and measuring means operatively connected to said work engaging member, calibrated indicating means operatively connected to said torque transmitting and measuring means, and Braille-type touch responsive calibrated index means on said calibrated indicating means for enabling the blind to determine the setting of said measuring means to preset the load at which further turning with said work engaging member is to be limited.

2. A preset measuring device defined in claim 1 comprising an audible feel responsive signal means to establish indicator functioning when said work engaging member has been turned to the preset load of said braille-type touch responsive calibrated index means controlling mechanism including an electrical energy source and a signal responsive thereto in circuit with said calibrated indicating and index means for operation when the load is at the preset torque.

3. A preset measuring device defined in claim 2 wherein said transmitting and measuring means includes a friction slip pointer and a stop pin on a calibrated dial thereof cooperating with said index means.

4. A preset measuring device defined in claim 3 wherein said friction slip pointer and said stop pin is directly connected to said index controlling mechanism for initial index means resetting.

5. A preset measuring device defined in claim 4 wherein said index controlling mechanism includes calibrated click producing instrumentalities comprises different types of individual and multiple notches on said calibrated measuring means and a sprng mounted ball in traversing contact thereover.

6. A preset measuring device defined in claim 5 wherein said click producing instrumentalities comprises graduated distinguishing indivdual and multple notches corresponding to dial calibrations and a spring impelled element for riding said notches to enable counting said notches by the sense of feeling clicks.

7. A preset measuring device defined in claim 6 wherein fine notches represent individual calibration units and comparatively coarser notches represent a multiple of individual calibration units to translate clicks into readings on said calibrated dial of the measuring device.

8. A preset measuring device defined in claim 4 wherein an index control plate is notched with distinguishing indivdual and multiple score line graduations to cooperate with a spring impelled element to ride thereof and audibly determine the setting of said pointer and pin relative to each other.

9. A preset measuring device defined in claim 8 wherein said notches are divided into fine individual units interspaced with coarser notches at predetermined multiples of said finer notches to audibly read the setting of said pointer relative to said pin in relation to the calibrated dial thereof.

10. A preset measuring device defined in claim 9 including an electrical indicator, an energy source, and a self-contained circuit embodying the latter and said pointer and pin to close the circuit when the torque load reaches the preset value established by said index controlling mechanism.

References Cited

UNITED STATES PATENTS

| | | | |
|---|---|---|---|
| 2,682,796 | 7/1954 | Larson | 73—139 X |
| 2,367,224 | 1/1945 | Larson. | |
| 2,792,734 | 5/1957 | Larson | 81—52.5 |
| 2,289,238 | 7/1942 | Brunelle | 73—139 X |

JAMES L. JONES, Jr., Primary Examiner